Dec. 13, 1960 S C. STRAUS 2,963,944
CONVERTIBLE MILLING MACHINE
Filed Aug. 30, 1956 5 Sheets-Sheet 1

INVENTOR.
S. Charles Straus.
BY
Wood, Herron & Evans.
ATTORNEYS.

Dec. 13, 1960 S C. STRAUS 2,963,944
CONVERTIBLE MILLING MACHINE
Filed Aug. 30, 1956 5 Sheets-Sheet 3

INVENTOR.
S. Charles Straus.
BY
Wood, Herron & Evans.
ATTORNEYS.

Dec. 13, 1960     S C. STRAUS     2,963,944
CONVERTIBLE MILLING MACHINE
Filed Aug. 30, 1956     5 Sheets-Sheet 4

INVENTOR.
S. Charles Straus.
BY
Wood, Herron & Evans,
ATTORNEYS.

Dec. 13, 1960 S C. STRAUS 2,963,944
CONVERTIBLE MILLING MACHINE
Filed Aug. 30, 1956 5 Sheets-Sheet 5

INVENTOR.
S. Charles Straus.
BY
Wood, Herron & Evans.
ATTORNEYS.

United States Patent Office 2,963,944
Patented Dec. 13, 1960

2,963,944

CONVERTIBLE MILLING MACHINE

S Charles Straus, Cincinnati, Ohio, assignor to Cincinnati Manufacturing Corporation, Cincinnati, Ohio, a corporation of Ohio Filed Aug. 30, 1956, Ser. No. 607,137

7 Claims. (Cl. 90—17)

This invention relates to milling machines. It is directed particularly to a convertible machine tool adapted conveniently for use in vertical milling or drilling, horizontal milling or drilling or for service as a universal milling machine, for cutting helix grooves, angular surfaces or the like.

The principal objective of this invention has been to provide a machine tool in which various types of machining operations just identified are combined with ease of convertibility from one type of operation to another and are combined with a degree of rigidity which has not heretofore been realized. In the past, milling machines which are essentially of the vertical milling machine type have been provided with demountable angle heads for use in horizontal milling, and horizontal type milling machines have been equipped with angle attachments for vertical milling service. However, the installation of conversion attachments is tedious and time consuming and at best, such attachments, when small enough to be lifted about manually, lack the rigidity which otherwise may be built into the main frame of the machine.

Other milling machines essentially of the vertical type have also been provided in which the tool spindle is angularly adjustable about a horizontal axis, whereby vertical or angular machining operations may be performed with a somewhat greater ease of convertibility. However, in such machines, the drive motor for the tool spindle is mounted at a level well above the work table, usually on the spindle head and this disposition of the relatively heavy driving motor inherently introduces vibrations which adversely affect the quality of the finish which the milling cutter is otherwise capable of producing. The problem to which the present invention is addressed is the problem of combining a high degree of rigidity with ease and convenience in the manner in which the machine may be converted from one type of service to another.

In accordance with this invention, the machine tool comprises a column or base of the usual rugged construction suited to sustain the loads and dampen the vibrations which are incident to all milling operations. The upper portion of this base rotatably supports a turret which is movable through a horizontal plane. The base at one side carries the usual knee and table which is movable through conventional elements in coordinate directions, and the turret carries a horizontal spindle which is adapted to receive a tool in position overhanging the table for horizontal milling. The turret however, also contains a portion depending down into the frame for supporting drive gearing through which power is transmitted to the spindle. Part of this power gearing, in the preferred construction, includes bevel gears, one of which is disposed on the axis of rotation of the turret, whereby mesh therewith is maintained by the other of the bevel gears upon rotation of the turret to various positions in the horizontal plane. Thus, a suspension for the relatively heavy drive gears, at a level generally below the horizontal plane of support of the turret, counterbalances and provides rigidity from vibration for the horizontal milling spindle which is located on the turret at a level above the horizontal plane of support for the turret. Accordingly, high quality of machine finish is provided in conjunction with the ease of angular adjustment of the turret from one position to another horizontally over the table. The drive motor in the preferred construction, is mounted within the base in any manner suitable for effective rotation of the shaft on which is mounted the bevel gear aligned with the axis of rotation of the turret.

In addition, a portion of the turret which is radially displaced from, or which is diametrically opposite the horizontal spindle tool socket, is equipped with a self-contained vertical milling head whereby the mere rotation of the turret about its vertical axis enables the operator to bring the vertical tool socket or the horizontal tool socket to the point of use over the table as desired.

In the preferred construction, the turret, at a level above the horizontal spindle which it carries, is equipped with a slidable overarm on which the vertical milling head and its independent drive motor are mounted. The portion of the overarm which is opposite the vertical milling head, projects beyond the horizontal spindle socket and carries a depending outboard bearing for a shaft or arbor on which the horizontal milling cutter may be mounted. Thus, the weight of the drive gearing for the horizontal milling shaft provides a low center of gravity which stabilizes the entire machine during either vertical or horizontal milling operations. Similarly, for helical gear cutting or the like, the turret may be indexed to the necessary angular positions over the table, which permits a simplified and rigid table mounting to be employed.

The self-contained vertical milling head does not form a part of the present invention and is disclosed in my copending application, Serial No. 609,754, filed on September 13, 1956. Briefly, the vertical head includes its own drive motor, spindle speed transmission and spindle feed mechanism. The head is permanently attached to an end of the overarm and includes a swivel mounting which permits it to be indexed to any desired angle upon the overarm about a horizontal axis. The overarm is shiftable along a horizontal plane upon the turret; accordingly, the indexing turret coacts with the vertical head in utilizing the machine for vertical and angular milling and in general machining operations, the main motor and table of the milling machine being used for supporting or feeding the work with respect to the vertical milling head in such vertical head operations.

The present machine, as desired, may be equipped with locks for fixing the turret in any position of use to which it has been rotated or indexed and also with a power drive for rotating the turret from one position of use to the other more rapidly or with greater ease than by manual effort. These features thus enable the machines of the present invention conveniently to provide horizontal, vertical, angular, or universal milling service with the degree of rigidity that has heretofore been provided only in single purpose machines and with little loss of time in effecting conversion from one type of machine operation to another.

A further objective of the present invention has been to provide an improved transmission system for driving the horizontal spindle of the turret at selected speeds. The transmission system utilizes in combination, a belt driving system and gear train mounted in the head, driven by the centralized bevel gear drive of the turret. The main motor of the column drives through a variable pitch pulley system which provides infinitely variable spindle speeds by hand wheel adjustment. These individual selective speeds are divided into two speed ranges by the turret gear train which is selectively shifted to a high or low range. A spindle speed indicator is in driving connection with the mechanism which shifts the variable pitch pulley system to provide direct indication of the selective spindle speeds in the high or low range.

Further advantages and features of the present invention appear in the following detailed description of the drawings in which a typical embodiment of the invention is illustrated.

GENERAL ARRANGEMENT

Figures 1, 2:
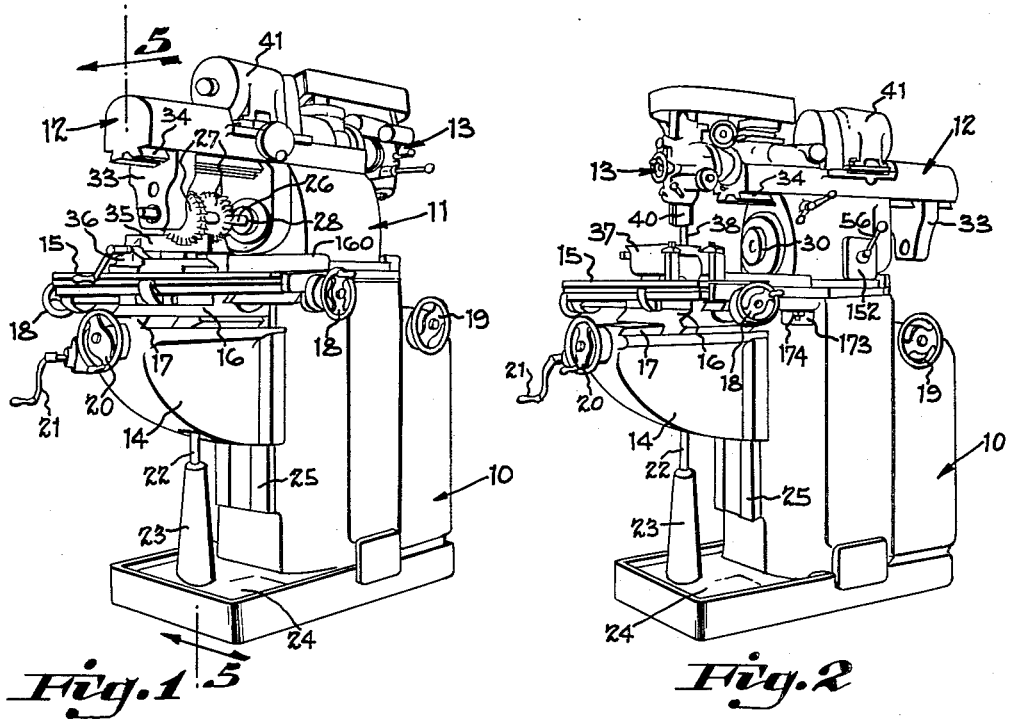
Figure 1 is a perspective view of the milling machine set up for a horizontal milling operation.
Figure 2 is a similar view showing the turret indexed for a vertical milling operation.

Described generally with reference to Figures 1 to 4, the milling machine comprises a hollow, box-like, column 10 having at its upper end a turret 11 which may be indexed about a vertical axis in setting up the machine for the various milling operations. Mounted on the top of the turret is a slidable overarm 12 which carries an angularly adjustable, vertical milling head 13. A knee 14 is slidably mounted at the front of the column for vertical adjustment, and a horizontal work table 15 is mounted upon a saddle 16 for longitudinal motion with respect to the knee. The saddle, in turn, is slidably mounted for transverse motion upon a dovetail slideway 17 formed on the upper surface of the knee.

The table includes a longitudinal feed screw which may be rotated from either end by means of the hand wheels 18, or by a power feed mechanism (not shown). The saddle and table are shifted as a unit transversely by a cross feed screw (not shown) rotatably journalled in the knee and rotated by the hand wheel 20. The knee and table is adjustable vertically by a crank 21 in driving connection with a knee elevating mechanism (not shown) which includes the vertical elevating screw 22. The elevating screw rises from a pedestal 23 supported upon the forwardly extended base portion 24 of the column. For vertical movement, the knee is carried by the vertical slideway 25 formed on the front of the column.

The table feed mechanism and knee construction do not form a part of the present invention and have been omitted from the disclosure.

Horizontal milling

Figure 5:
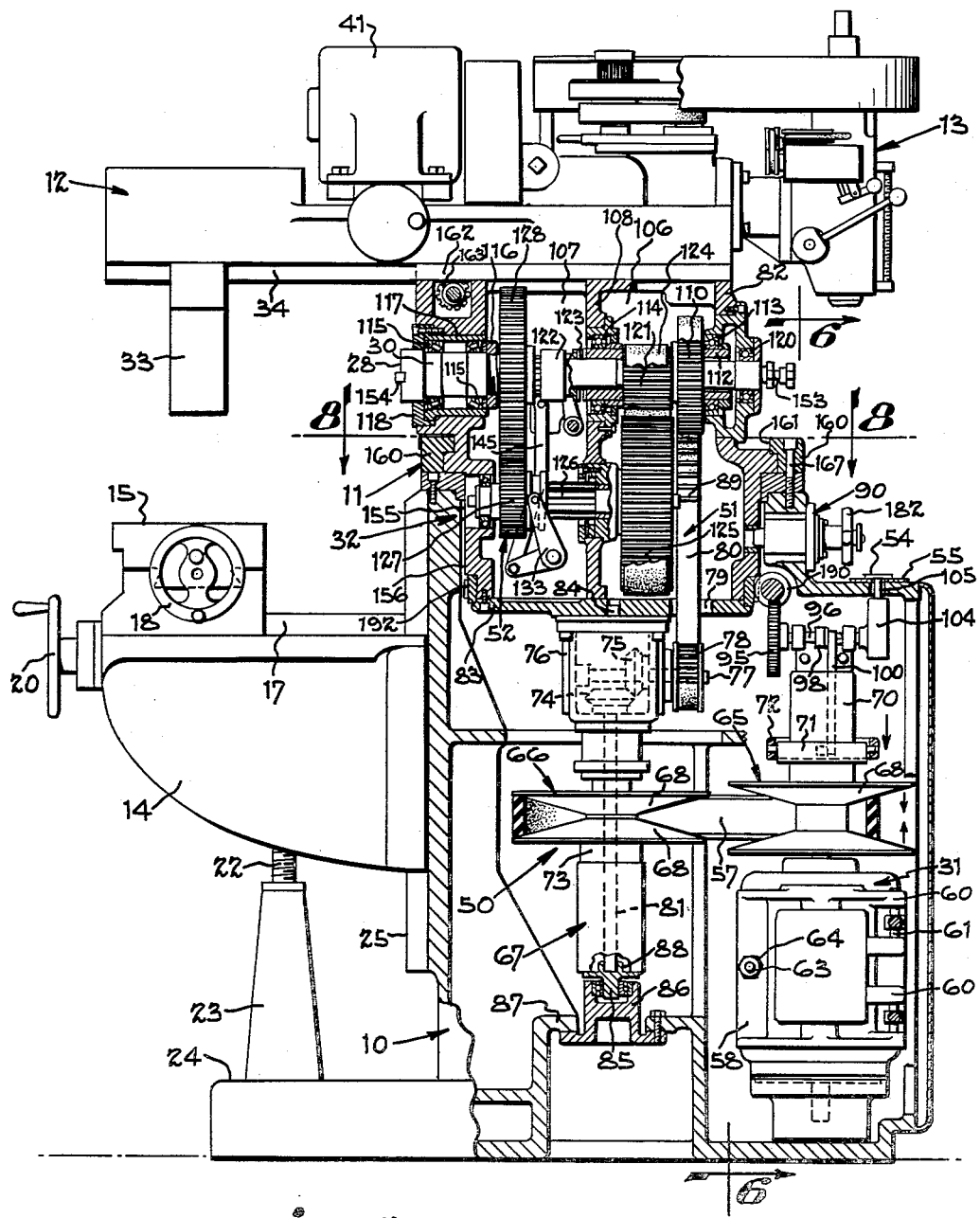
Figure 5 is a fragmentary vertical section of the machine as viewed along lines 5—5 of Figure 1. In this view, the gear and belt transmission of the horizontal spindle is shown in its low speed range.

When the machine is set up for a horizontal milling operation as shown in Figure 1, the turret 11 is swivelled by rotating a hand wheel 19 (optionally by a motor) to bring the overarm 12 to a position overhanging the table and a horizontal arbor 26, including milling cutters 27, is mounted in the nose 28 of the horizontal spindle 30 (Figure 5). The horizontal spindle is driven from the main motor 31 and transmission 32 of the column as described later. The outer end of arbor 26 is journalled in the outboard bearing 33 which is slidably mounted upon a dovetail slideway 34 of the overarm 12. The milling cutters 27 of the arbor reside between the column and outboard bearing.

The use of the indexing turret eliminates the conventional swivel mounting of the table and thus simplifies the construction. Moreover, the improved construction provides a more rigid support for the work since the table is seated directly upon the saddle without a swivel structure interposed between the table and saddle.

In setting up the machine for this operation, the turret is locked in position, the workpiece 35 is clamped in a fixture 36 which is attached to the table according to the conventional practice. The knee is elevated by operation of crank 21 to bring the work to the required cutting plane, the table being shifted transversely by operation of hand wheel 20 to align the workpiece with the rotating cutter or cutters. Thereafter, the table is fed longitudinally either by power or by operation of hand wheel 18 so as to feed the work longitudinally beneath the cutters.

Vertical and angular milling

It will be noted in Figure 1, that the vertical head 13 is mounted on the opposite end of the overarm; hence, in setting up the machine for a vertical milling operation, as shown in Figure 2, the turret is turned about its vertical axis (hand wheel 19) to present the vertical head 13 to the work 37. In this operation, an end cutting or face cutting tool 38, rotating about a vertical axis, may be mounted in the spindle 40 of the vertical head. The vertical head is driven independently by its own motor 41 which is mounted at the top of the overarm; therefore, during this operation, the horizontal spindle 30 is not used. During the vertical milling operation, the table is adjusted to the proper operating plane and is fed longitudinally with respect to the tool as explained with reference to the horizontal milling operation.

It is to be noted that the vertical head includes a power feed mechanism for feeding spindle 40 and its tool axially into work if the operation is of the type which requires such feed. The spindle transmission, feed mechanism, and swivel mounting of vertical head 13 and other details are disclosed in my aforesaid co-pending application, Serial No. 609,754.

Figures 3, 4:
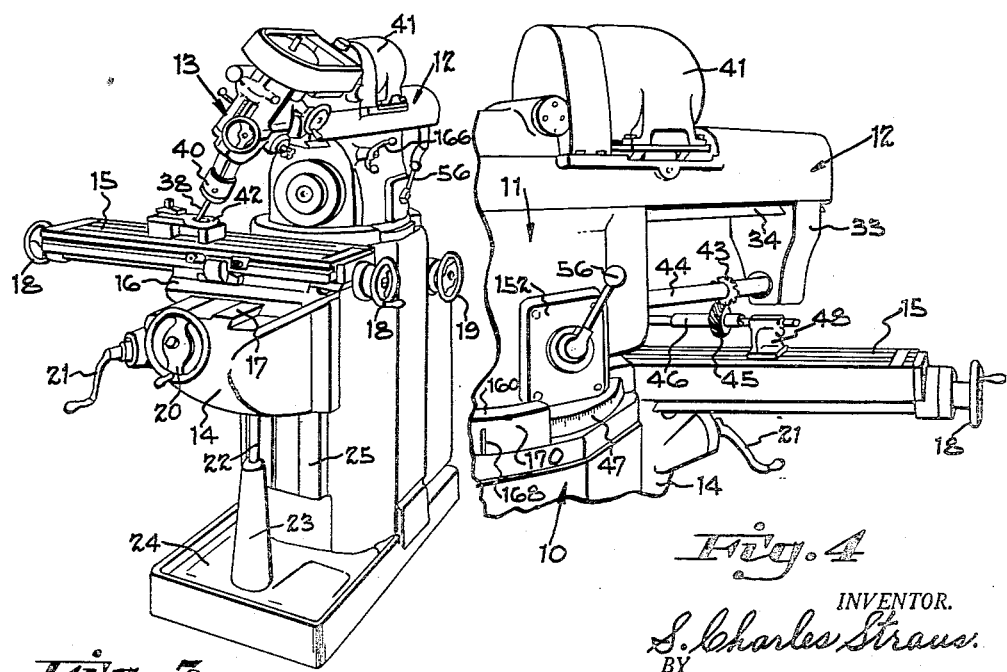
Figure 3 shows the vertical head adjusted from the position of Figure 2 for an angular milling operation.
Figure 4 shows the turret adjusted for a universal milling operation.

In setting up the machine for an angular milling operation (Figure 3) the turret is indexed at right angles as in Figure 2, with the vertical milling head 13 presented to the work. However, in this case, head 13 is indexed about a horizontal axis with respect to the overarm so as to present the spindle 40 and tool 38 at an angle to the work 42, as shown in Figure 3. In this operation, the spindle also may be fed axially by power if the work so requires.

Universal milling

For universal milling, the turret is indexed about its vertical axis to position the overarm 12 and horizontal spindle 30 at an angle to the table as shown in Figure 4. For this operation, a milling cutter 43 is mounted on a horizontal arbor 44 between the spindle nose 28 and overarm bearing 33, and the main motor and spindle transmission are utilized to drive the cutter. In the example illustrated, the work consists of a spiral gear 45 mounted upon a rotatable mandrel 46 journalled between bearing fixtures or centers (as explained later). The angle of the overarm is then set to the angle of the spiral grooves to be generated. The base of the turret preferably is graduated as at 47 in Figure 4, to provide direct reading of the angular relationship of the overarm and table.

In machining a spiral gear as illustrated in Figure 4, or in other operations involving the generation of spiral grooves of a similar nature, the work is rotated as the milling cutter forms the grooves which delineate the gear teeth. For this purpose, work mandrel 46 has one end rotatably mounted in a centering device or fixture 48, while its opposite end is mounted in an indexing fixture or head, which is in driving connection with the table feed mechanism. The indexing mechanism is well known in the art and has not been disclosed. Briefly, the indexing mechanism rotates the gear blank intermittently during the non-cutting stroke of the table; this properly spaces the cuts which delineate the gear teeth. In addition, during the cutting stroke, the indexing mechanism turns the work slowly, with the result that the longitudinal feed of the table advances the work through the cutting plane while the combined longitudinal and turning movements generate the spiral groove. The indexing mechanism includes speed change gears which are selected to rotate the work at a speed necessary to produce the selected spiral lead. It will be understood that the angle at which the turret is set is dictated by the diameter of the work and the lead of the spiral grooves which are to be generated.

Variable speed transmission generally

Figures 10, 11, 12:
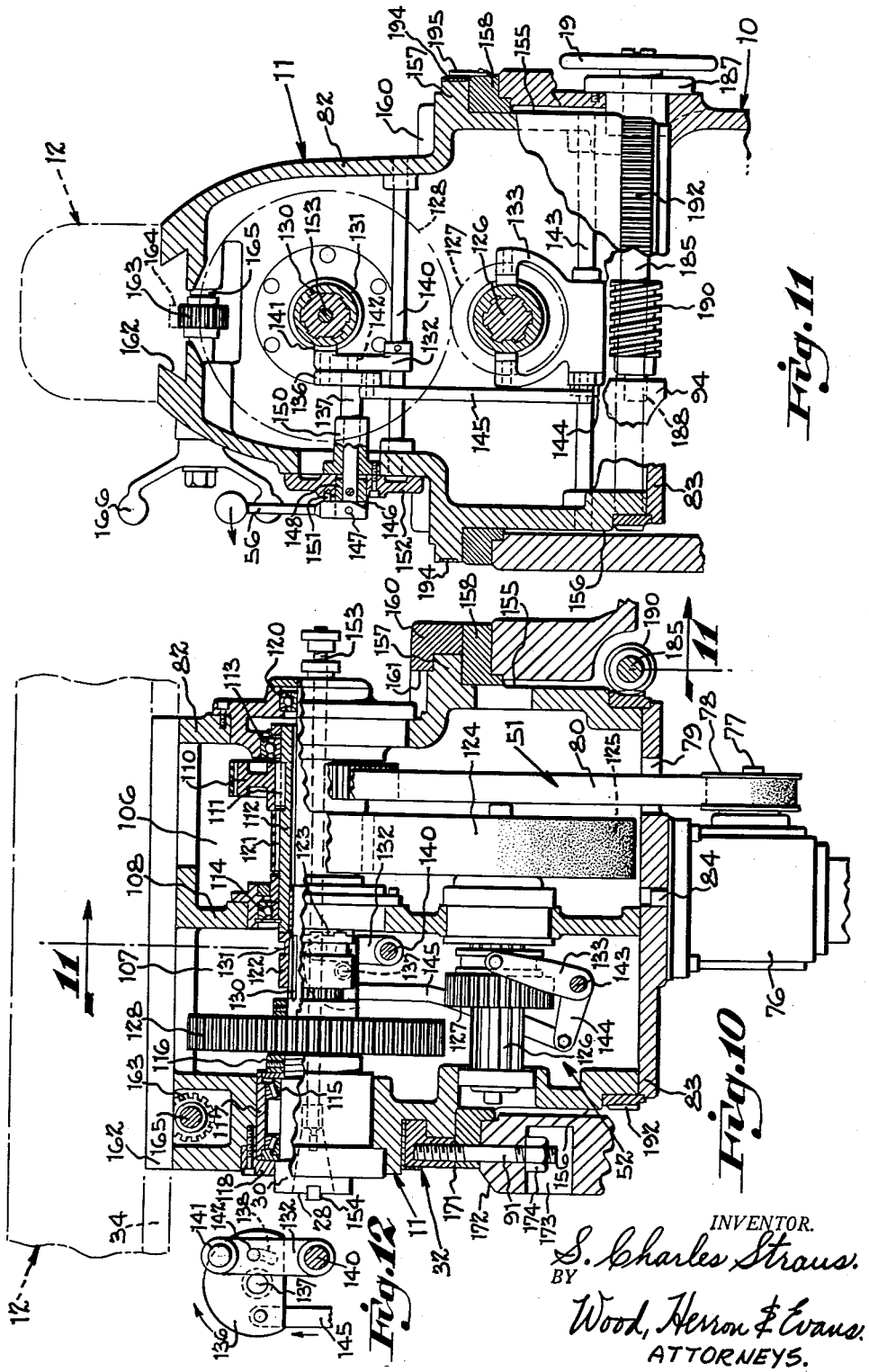
Figure 10 is an enlarged sectional view taken from Figure 5, showing the gear and belt transmission shifted to its high speed range.
Figure 11 is a sectional view taken along line 11—11 of Figure 10, illustrating the shifter mechanism of the gear train which provides the high and low speed ranges.
Figure 12 is a fragmentary view, taken from Figure 10, showing the cam which shifts the gear train.

The horizontal spindle 30 is driven by the main motor 31 through a variable pitch pulley system and transmission 32 at infinitely variable spindle speeds (Figure 5). In the present example, the pulley system and transmission provide spindle feeds in two ranges: the first range consists of speeds from 29 r.p.m. to 200 r.p.m. and the second range consists of speeds from 200 r.p.m. to 1450 r.p.m. The spindle drive in the low speed range (29 r.p.m. to 200 r.p.m.) is by way of the main motor 31, variable pitch pulley system 50, timing belt drive 51, and gear train 52, as shown in Figure 5. The high speed range (200 r.p.m. to 1450 r.p.m.) is obtained by uncoupling the gear train 52 and driving the spindle directly through the variable pitch pulley system 50 and timing belt drive 51, thus by-passing the gear train 52, as shown in Figure 10.

In both spindle speed ranges, the speeds are selected simply by rotating the hand wheel 53 (Figure 6), which changes the pitch of the main motor pulley system. This mechanism is described in detail later. The selected spindle speed is denoted by a pointer 54 (Figure 8) which moves with reference to the graduations carried by a speed indicator plate 55. This plate is divided into two sections, one section showing the low speed range and the other high speed range.

The two speed ranges are selected by the range selector lever 56 (Figures 4 and 11) which is selectively shifted in two positions for the high or low speed range. This lever is connected to a cam and link system which couples or uncouples the low speed gear train 52 as explained later. The transmission is shown in its low speed range in Figure 5 and its high speed range, by-passing the gear train, in Figure 10.

Variable pitch pulley system

Referring to Figure 5, the main motor 31 which drives the horizontal spindle through the variable pitch pulley system 50 is mounted in the lower portion of column 10. For the purpose of keeping the driving belt 57 taut, motor 31 is bolted to a hinged base 58 having lugs 60 carried upon pivot pins 61 which are supported on lugs 62 projecting from the column wall. Belt adjustment is obtained by a jack screw 63 (Figure 6) passing through the swinging end of the hinged plate 58 and locked by the nuts 64. The end of the jack screw engages the wall of the column and, upon being adjusted, swings the motor in a direction to tighten belt 57.

The variable pitch drive 50 comprises the motor pulley 65 mounted on the shaft of the main motor 31 and a driven pulley 66, which is mounted upon an intermediate shaft assembly 67, the two pulleys being connected by the belt 57. The two variable pitch pulleys are of conventional design and their exact construction therefore has been omitted. In general, each pulley comprises a pair of separable disk-like flange sections 68, each pair delineating a generally V-shaped traction pulley engaging the belt.

The sections of the motor pulley are carried by axially shiftable sleeves 70. These sleeves are relatively shifted by operation of the speed change mechanism under the control of the hand wheel 53 (Figure 6) noted earlier. For this purpose, the upper sleeve 70 includes a shifter ring 71 engaged by a yoke lever 72. The sections of the driven pulley 66 likewise are carried by shiftable sleeves as indicated at 73.

The apparatus is shown in its low speed adjustment in Figure 5, the motor pulley being adjusted to its small pitch and the driven pulley correspondingly shifted to its maximum pitch. The speed change hand wheel 53 is rotated while the motor is running; thus, as the sleeves 70 of the motor pulley are shifted toward one another, as indicated by the arrows, the effective pitch of the motor pulley is increased. The sections of driven pulley, in the usual way, separate in response to the pitch change of the motor pulley, and at the limit of high speed adjustment, the positions of the pulley sections are reversed from that shown in Figure 5.

The drive from the intermediate shaft assembly to the spindle transmission 32 is by way of the right angle bevel gear train, consisting of bevel gears 74 and 75 enclosed by gear box 76 which is bolted directly to the bottom of the turret housing 82, and centered by a dowel 84. Bevel gear 75 is mounted upon a cross shaft 77 which drives a timer gear 78 meshing with a timer belt 80 extending through a slot 79 to the spindle transmission. Bevel gear 74 is attached to the end of a vertical shaft 81 having its upper end journalled in gear box 76, the vertical shaft being driven by pulley 66. The timer belt 80 is conventional and is fabricated from a pliable material including teeth 89 meshing with the teeth of gear 78 to provide a positive driving connection with the spindle transmission within the turret housing as explained later.

Figure 9:
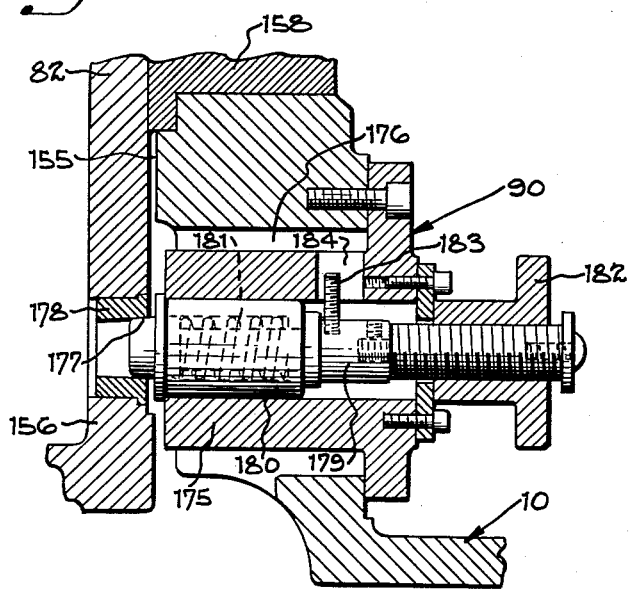
Figure 9 is a sectional view taken along line 9—9 of Figure 8, detailing the turret indexing plunger.

The intermediate shaft assembly 67 and gear box 76 form a composite unit coaxial with the turning axis of the turret housing 82 and suspended from it; therefore, the gear box and shaft assembly turn with the turret housing during the indexing motion. Since bevel gear 74 is concentric to the turning axis of the turret, its companion gear 75 is free to change its radial position in relation to gear 74 without creating any interference. As shown in Figure 5, the lower end of shaft assembly 67 includes a pilot shaft 85 journalled in a ball bearing which is seated in a cup 86. The cup is bolted to the top flange of a mounting box 87 rising from the bottom of column 10. It will be noted that the lower end of the central shaft 81 of the shaft assembly is journalled in a bearing 88 coaxial with the pilot shaft 85. Since the torque is transmitted by shaft 81, it tends to rotate the turret housing 82. To overcome the turning force, the turret housing is locked in selected position by the plunger assembly indicated at 90 in Figure 9 when in right angular position above the table (Figure 1) and by clamping studs 91 (Figure 10). The turret may be indexed whether the main motor is running or not by virtue of the coaxial arrangement of shaft assembly 67, as noted earlier. When it is necessary to index the turret from the right angular position, the plunger is disengaged, the clamping studs 91 are released, then the turret and its overarm are rotated by means of the indexing hand wheel 19 or by a motor as described later.

Figure 7:
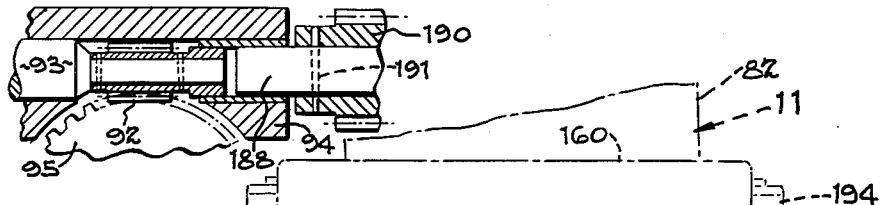
Figure 7 is an enlarged fragmentary view taken from Figure 6, further detailing the speed change system.
Figure 6:
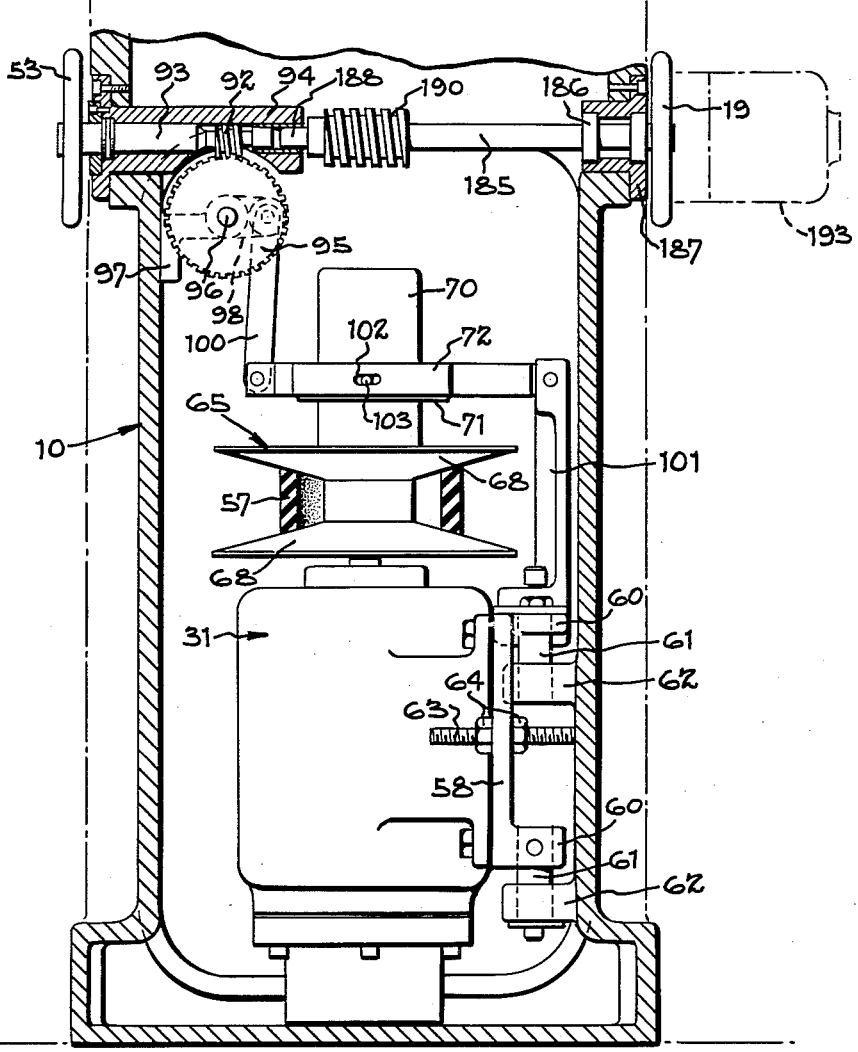
Figure 6 is an enlarged fragmentary sectional view of the variable pitch pulley system, taken along the lines 6—6 of Figure 5.

Referring to Figures 5 to 7, the mechanism for changing the pitch of motor pulley 65 comprises a worm 92 pinned to the shaft 93 of the speed change hand wheel 53. The shaft and worm are rotatably journalled in a sleeve 94 projecting inwardly from the column wall. Worm 92 meshes with a worm wheel 95 keyed to a rock shaft 96 journalled in bracket 97 which is attached to the column wall. Secured to rock shaft 96 is a lever 98 having its outer end pivotally connected by a link 100 to yoke lever 72. The opposite end of yoke lever 72 is pivotally connected to a bracket 101 rising from the motor mounting plate 58. Yoke lever 72 loosely encircles shifter ring 71 and includes a pair of slots 102 at opposite sides, loosely confining the opposed pins 103 which project outwardly from ring 71. Rotation of hand wheel 53 imparts rotary motion to the worm wheel and lever 98; thus, raising or lowering yoke lever 72 to change the pitch of the pulley system. As noted earlier, the speed change adjustment is carried out while the motor is running in order to allow the belt to shift as the spacing of the pulley flanges is changed.

The speed indicator 55 previously noted, comprises a pointer support 104 attached to an end of rock shaft 96. The pointer 54 is carried by a stem which projects through a slot 105 in the top wall of the column and speed indicator plate 55. Pointer 54 is double ended and thus shifts with respect to the two sets of speed graduations in accordance with the rotation of hand wheel 53. In setting up the machine for a desired spindle speed, the operator shifts range selector lever 56 to the high or low range, whichever includes the desired speed, then rotates hand wheel 53 so as to align pointer 54 with the desired speed as denoted on the high or low range of the indictaor plate.

*Spindle transmission*

The turret housing 82 (Figures 8 and 10) is divided into a dry compartment 106 for the timer belt drive 51 and a gear train compartment 107 which contains lubricant. The two compartments are delineated by the intermediate wall 108, the two compartments being sealed off from one another. The two compartments are provided because the timing belt drive requires no lubricant.

As best shown in Figure 10, the timing belt 80, from the variable pitch pulley system, meshes with a timing gear 110 which is keyed as at 111 to a sleeve 112 concentric with spindle 30 and journalled by ball bearings 113 and 114 mounted in the rear wall and intermediate wall of the turret housing. Bearing 114, of the intermediate wall, includes a lubricant seal. The sleeve is concentric with the spindle and free to rotate relative to it. The nose end of the spindle is supported in a pair of sealed, taper roller bearings 115—115 carried in the front wall of the housing. An adjustment ring 116 is threaded on the spindle for bearing adjustment and is locked by a set screw in the usual way. The bearing assembly is confined in a sleeve 117 including a closure ring 118 bolted to the housing wall. The tail end of the spindle is journalled in a ball bearing 120 mounted in the rear wall.

Sleeve 112 includes a small timer gear 121, its teeth being machined directly into the sleeve. In the high speed range (Figure 10), the drive is directly from the pulley system to timer gear 110 and by way of sleeve 112 to the spindle. This drive is completed from the sleeve to the spindle by a clutch collar 122 slidably splined on the spindle and having teeth meshing with teeth 123 formed in the end of the sleeve which projects through the intermediate wall. In this adjustment, the gear train 52 is by-passed, as explained later.

When the selector lever is shifted to low range (Figure 5), the spindle drive is by way of timer gear 110 and from small gear 121, secondary timer belt 124 to low range timer gear 125 keyed to the splined counter shaft 126. Slidably splined on counter shaft 126 is a pinion 127, which in low range adjustment, (Figure 5) meshes with a large gear 128 keyed directly to the spindle. When clutch collar 122 is shifted toward the right to its engaged position (high range) the pinion 127 concurrently is shifted to the right, out of mesh with large gear 128. The purpose of this arrangement is to prevent the locking of the transmission and possible damage, which could occur if the clutch were engaged with the gear and pinion in mesh.

As shown in Figure 10, the mid-section of the spindle includes a splined portion 130 which slidably keys the clutch collar to the spindle. The clutch further includes a groove 131 which is engaged by a shifter arm 132 of the range selector mechanism. The shiftable pinion 127 likewise includes a grooved portion which is engaged by a yoke element 133 of the selector mechanism.

The clutch shifter arm 132 and yoke 133 are shifted by a cam and link structure of selector lever 56, as shown in Figures 10–12. A cam 136 is attached to the inner end of a rock shaft 137 and includes a slot 138 which is eccentric to the axis of shaft 137. The shifter arm 132 of the clutch is pivotally carried upon a cross rod 140 located below the spindle, and the upper end of the arm includes a pin 141 engaging the groove 131 of the clutch. Another pin 142 projects from the shifter arm into the eccentric slot 138. Thus, as the cam is rotated in the direction shown in Figure 12, the slot cams the arm toward right into clutch engaging position. The cam is shown in the high range position in Figure 12, corresponding to the position of the clutch and pinion of Figure 10.

The pinion yoke 133, previously noted, is pivotally mounted on a cross rod 143 extending below the counter shaft. A lever arm 144 extends from the yoke at right angles and a link 145 pivotally connects the yoke lever to the shifter cam 136. Accordingly, as the cam is rotated in the direction indicated (Figure 12), the link is drawn upwardly, causing yoke 133 to shift pinion 127 out of mesh toward the right as shown.

Referring to Figure 11, it will be noted that selector lever 56 includes a flat end portion 146 which is pivotally connected as at 147 to a slotted bushing 148 which is pinned to rock shaft 137. The rock shaft is journalled in a sleeve 150 mounted in the turret housing. The lever includes a pin 151 which selectively enters locking apertures in a plate 152. These apertures hold the selector lever in its high or low range position. To shift the apparatus from one range to another, the lever, which is spring biased to the position shown, is pulled outwardly to disengage locking pin 151.

The milling cutters or arbors are mounted in the spindle by a draw bar 153 in the usual way. The nose portion 28 includes a tapered bore for receiving the shank portion of the cutters or arbors. The shank conventionally includes threaded bore which is engaged by the threaded end of the draw bar. The nose also includes a cross key 154 which interfits a slot formed in the tools. The rearward end of the draw bar projects outwardly from the tail end of the spindle for manipulating the draw bar.

*Turret construction*

As shown in Figures 10 and 11, the top of the column includes a circular rimmed opening 155 and the lower portion 156 of the turret housing depends into the opening. The turret housing includes a circular flange 157 seated upon a bearing ring 158, which is seated on the top surface of rim 155. The turret is retained in position by a pair of arcuate clamping shoes 160—160 (Figure 8), each having a lug 161 overhanging the edge of the circular turret flange 157.

The upper portion of the turret includes a dovetail way 162 engaging a dovetail of the overarm 12, such that the entire weight load of the turret assembly, including the suspended shaft assembly 67, is carried by the turret flange. The overarm is adjusted lineally by a pinion 163 meshing with a rack 164 secured to the overarm. The pinion is mounted on shaft 165 journalled in the upper portion of the turret and rotated by a horned lever 166 attached to the shaft.

Figure 8:
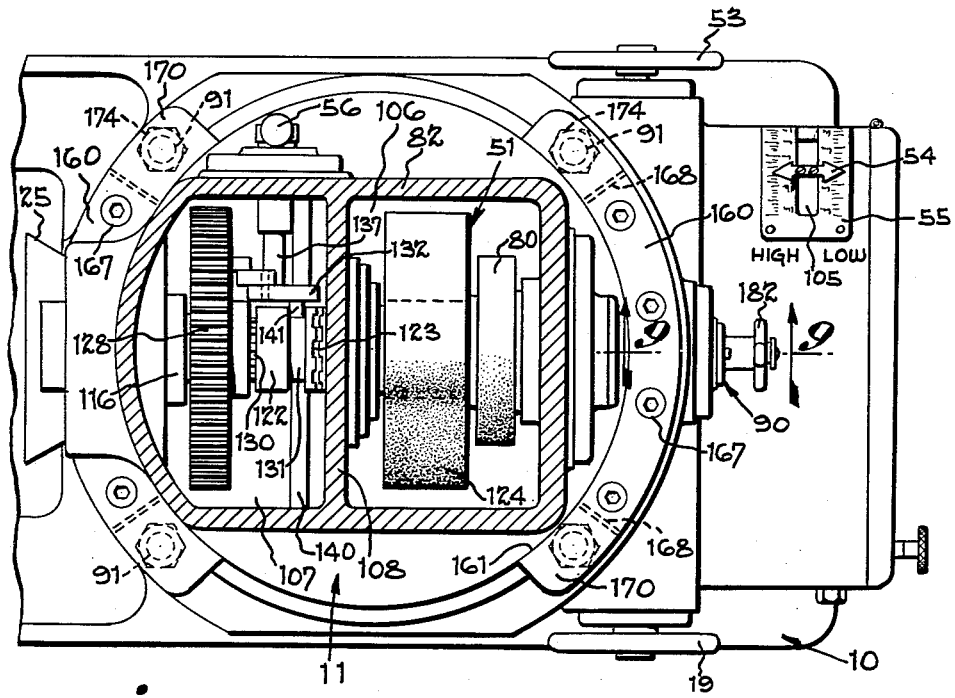
Figure 8 is a sectional view taken along line 8—8 of Figure 5, further detailing the gear and belt transmission which drives the horizontal spindle.

The clamping shoes 160 are attached to column rim 155 by screws 167. The shoes proper interfit snugly the column flange 157 for indexing motion. As shown in Figures 4 and 8, the endwise portion of each shoe is slotted radially as at 168. These slots delineate the clamping portion 170 of the shoes. In other words, the slots impart flexibility to the clamping portions, allowing them to be drawn downwardly into clamping engagement with the turret flange. For this purpose, the lower surface of the clamping portions, as indicated at 171 in Figure 10, is relieved slightly to provide clearance for downward motion. The clamping pressure is applied by the studs 91 (Figure 10), having their upper ends threaded into the clamping portions and passing downwardly through the flange portion 172 of the column, which is delineated by inset recesses 173. Clamping nuts 174 (Figures 2 and 10) are threaded upon the studs and draw the clamping portions of the shoes into pressure engagement with the turret flange. When the turret is to be indexed, the nuts are loosened with a wrench.

The plunger assembly 90, which locks the turret in its right angular position, comprises a flanged sleeve 175 bolted to the circular column rim and residing in a bore 176 formed therein. An indexing plunger 179 has a tapered end portion 177 which interfits the bore of a bushing 178 seated in the depending portion 156 of the turret. Plunger 179 is slidably confined within a spring retainer sleeve 180 having a heavy spring 181 in compression between a shoulder of the plunger and a shoulder of the retainer.

The outer end portion of plunger 179 is threaded and includes a star wheel 182 threaded thereon. As the star wheel is rotated, the plunger is retracted against the force of spring 181. To prevent rotation of the plunger, a screw 183 is threaded into the plunger and projects upwardly into a slot 184. To index the turret, star wheel 182 is rotated until the plunger is withdrawn from the bushing, the clamping nuts 174 are loosened to permit turning motion. In the present example, the bushing is located to lock the turret with the overarm in the right angular position of Figure 1, although additional bushings may be also located at points around the column rim to index the turret to other selected angles. It will be understood that the plunger 179 is held in its disengaged position by its star wheel while turning the turret.

Referring to Figure 6, the turret indexing hand wheel 19 is mounted upon a shaft 185 having its outer portion journalled in bearings 186 mounted in a bearing holder which is bolted to the column. Inner end of shaft 185 includes a pilot shaft 188 journalled in the sleeve 94 of the speed selector shaft 93, the two shafts being coaxial. A worm 190 is pinned as at 191 to indexing shaft 185 and meshes with a ring-shaped worm wheel 192 attached to the depending portion 156 of the turret (Figures 10 and 11). Rotation of the hand wheel thus imparts a slow turning motion to the turret. If desired, an indexing motor 193, as shown in broken lines in Figure 6, may be connected to the indexing shaft 185. The motor preferably is of the gear head type for speed reduction.

The turret angle graduations 46 previously noted, are carried by a band 194 attached to the circular turret flange 157 (Figure 10). A reference pointer 195 is attached to the column adjacent the band to indicate the overarm angle (Figure 11).

Having described my invention, I claim:

1. In a convertible milling machine, a hollow column, said column having an open upper end, a turret mounted for turning motion about a vertical axis upon the upper end of the column, said turret having a portion depending downwardly into the column, a horizontal tool spindle rotatably journalled in the turret above the upper end of the column which supports the turret, a spindle transmission mounted in the said depending portion of the turret and in driving connection with the spindle, the downward extent of the depending portion of the turret below the open upper end of the column being at least equal to the distance at which the horizontal tool spindle resides above the upper end of the turret, the weight of said depending portion stabilizing said turret against vibrations generated through rotation of the spindle during machining operations thereof, centralized driving means extending downwardly from the depending portion of the turret and in driving connection with said spindle transmission, said driving means being located upon the vertical axis of turning motion of the turret, said depending portion and centralized driving means thereof being movable with the turret about said vertical axis, and motor means in said column connected to said centralized driving means for driving the tool spindle through said spindle transmission, whereby said turret and the tool spindle thereof is rotatable about said centralized driving means to provide angular adjustment of the tool spindle in a horizontal plane.

2. In a milling machine, a hollow column having a work table shiftable in a horizontal plane, said column having an open upper end, a turret mounted on the said upper end of the column for turning movement about a vertical axis, said turret having a transmission housing depending downwardly into the column, said transmission housing being movable with said turret about said vertical axis, a horizontal tool spindle rotatably mounted in said turret above the upper end of the column, a spindle transmission system mounted in the transmission housing and in driving connection with the spindle, said transmission housing extending downwardly below the open upper end of the column for a distance at least equal to the distance at which the tool spindle resides above said upper end, the weight of said transmission housing thereby stabilizing the turret against vibrations generated through rotation of the tool spindle during machining operations thereof, a vertical shaft in driving connection with said transmission system, said vertical shaft extending downwardly from said transmission and residing upon the vertical axis of turning movement of the turret, a power motor mounted in the column below said transmission housing, said motor residing along a vertical axis, a variable pitch pulley system connecting said motor to the said vertical shaft, manually operated sleector means connected to the variable pitch pulley system for changing the pitch thereof, said pulley system driving the spindle transmission and spindle at selected speeds, said vertical shaft adapting the turret to be turned relative to the column, thereby to index said horizontal tool spindle angularly with respect to the said work table.

3. In a milling machine, a column having an open upper end, a turret having a peripheral flange supported upon the upper end of said column, said turret being mounted for rotary indexing motion about a vertical axis on the column, said turret having a transmission housing depending downwardly into said column from said peripheral flange, said transmission housing being movable with the turret about said vertical axis, a horizontal tool spindle rotatably journalled in the turret above said support flange, a spindle transmission mounted in the transmission housing of the turret and in driving connection with the spindle for driving the same, a gear housing mounted at the bottom of said transmission housing, said gear housing having a horizontal shaft journalled therein, driving means connecting said shaft to the spindle transmission, a vertical shaft extending downwardly from said gear box and residing upon the vertical axis of rotation of the turret, and means connected to the vertical shaft for driving the same, whereby said vertical shaft drives the spindle transmission and spindle through said gear box, said vertical shaft adapting the turret to be rotated about said vertical axis to position the horizontal tool spindle angularly with respect to a workpiece.

4. In a milling machine, a hollow column having a work support table shiftable along a horizontal plane, said column having an open upper end, a turret having a peripheral flange supported upon the upper end of said column, said turret being mounted for rotary indexing motion about a vertical axis on the column, said turret having a transmission housing depending downwardly into said column from said peripheral flange, a horizontal tool spindle rotatably journalled in the turret above said flange, the downward extent of said transmission housing below said peripheral flange being at least equal to the distance at which the tool spindle resides above said flange, said transmission housing being movable with the turret about said vertical axis, a spindle transmission mounted in the transmission housing of the turet and in driving connection with the spindle for driving the same, a gear housing mounted at the bottom of said transmission housing, said gear housing having a horizontal shaft journalled therein, driving means connecting said shaft to the spindle transmission, a vertical shaft extending downwardly from said gear box and residing upon the vertical axis of rotary motion of the turret, a power motor mounted in the column and in driving connection with said shaft for rotating the same, gears in said gear box connecting the vertical shaft to the said horizontal shaft, whereby said vertical shaft drives the spindle transmission and spindle through said gears and driving means, said vertical shaft adapting the turret to be rotated about said vertical axis to position the horizontal tool spindle angularly with respect to the work support table.

5. In a convertible milling machine, a column having an open upper end, a turret mounted for rotary motion about a vertical axis upon said column, said turret having a support flange resting upon said column, said turret mounted for rotary motion about a vertical axis, a horizontal tool spindle journalled in the turret above the said flange, said turret having a transmission housing depending downwardly from said flange into the column, a transmission in said housing in driving connection with the spindle, centralized driving means connected to the said transmission for driving the same, said driving means extending downwardly from the transmission housing on the axis of rotary motion of the turret, said transmission housing and centralized driving means being movable with the turret about said vertical axis, an indexing gear mounted upon the said transmission housing, an indexing shaft journalled in the column, a worm keyed to said indexing shaft and meshing with said gear, means connected to said indexing shaft for rotating the same and thereby turning said turret, transmission housing and centralized driving means about said vertical axis, clamping means on the column engageable with the flange of the turret, and manually operated means connected to the clamping means for forcing the same into clamping engagement with said flange, thereby to lock the turret rigidly in an indexed position.

6. In a milling machine, a column having an open upper end, a turret housing having a support flange seated upon the open upper end of the column, said turret movable about a vertical axis, a transmission housing depending from said turret housing below said flange, said transmission housing forming a part of said turret and being movable therewith about said vertical axis, a horizontal tool spindle mounted in the turret housing above said flange, a counter shaft journalled in said transmission housing below said spindle, a low range driving gear keyed on said spindle, a low range pinion slidably keyed on said counter shaft and shiftable to and from meshing engagement with the low range driving gear of the spindle, a driving sleeve rotatably journalled on said spindle, a high range pulley mounted on said sleeve, a motor mounted in the column and in driving connection with said high range pulley, a clutch element slidably keyed to the spindle and engageable with said driving sleeve, said clutch element, upon being engaged, providing a direct connection from the driving sleeve to the spindle, a low range pulley on said driving sleeve, a companion low range pulley keyed to the counter shaft, a belt connecting the low range pulleys of the spindle and counter shaft, manually operated range selector means connected to said clutch element and pinion for shifting said clutch element to a disengaged position and concurrently shifting the pinion of the counter shaft into mesh with low range driving gear when the said range selector is shifted to a low range position and concurrently shifting the clutch element into engagement with the driving sleeve and the pinion from said meshing engagement with the low range gear when the range selector is shifted to a second position.

7. In a milling machine, a column having an open upper end, a turret housing having a support flange mounted upon the upper end of the column for rotary indexing motion about a vertical axis, a transmission housing depending downwardly into the column from said turret housing below said flange, said transmission housing forming a part of said turret and being movable therewith about said vertical axis, a horizontal tool spindle mounted in the turret housing above said flange, a counter shaft journalled in said transmission housing, a low range driving gear keyed on said spindle, a low range pinion slidably keyed on said counter shaft and shiftable to and from meshing engagement with the low range driving gear of the spindle, a driving sleeve rotatably journalled on the spindle, a high range pulley on said sleeve, a vertical driving shaft residing on the vertical axis of rotary motion of the turret, driving means connecting said vertical driving shaft to said high range pulley, said vertical shaft driving said high range pulley and providing rotary turret motion about said vertical axis, coupling means keyed to the spindle and engageable with the driving sleeve, manually operated range selector means connected in common to the coupling means and pinion of the counter shaft, said manually operated selector means selectively shifting said coupling means to engaged position and the pinion to disengaged position, thereby providing a high range driving connection to the spindle, said manually selector operated means shiftable to a second position for concurrently shifting said clutch element to a disengaged position and for shifting the pinion into meshing engagement with said low range gear, thereby providing a low range driving connection to the spindle.

References Cited in the file of this patent
UNITED STATES PATENTS

| | | |
|---|---|---|
| 1,242,775 | Curtis | Oct. 9, 1917 |
| 1,269,727 | Metz | June 18, 1918 |
| 2,085,888 | Armitage | July 6, 1937 |
| 2,275,291 | Bannow | Mar. 3, 1942 |
| 2,289,912 | Hirsch | July 14, 1942 |
| 2,342,829 | Armitage | Feb. 29, 1944 |
| 2,449,546 | Buckendale et al. | Sept. 21, 1948 |
| 2,456,894 | Ryker | Dec. 21, 1948 |
| 2,491,940 | Tree | Dec. 20, 1949 |
| 2,604,019 | Malnar | July 22, 1952 |
| 2,618,202 | Eserkaln | Nov. 8, 1952 |
| 2,657,616 | Armitage et al. | Nov. 3, 1953 |
| 2,664,789 | Tree | Jan. 5, 1954 |
| 2,703,986 | McClelland | Mar. 15, 1955 |
| 2,749,595 | McNamee | June 12, 1956 |
| 2,770,978 | Troemel | Nov. 20, 1956 |
| 2,816,487 | Armitage et al. | Dec. 17, 1957 |